(12) United States Patent
Ohnishi et al.

(10) Patent No.: US 11,091,635 B1
(45) Date of Patent: Aug. 17, 2021

(54) POLYARYLENE SULFIDE-BASED RESIN COMPOSITION AND INSERT-MOLDED PRODUCT

(71) Applicant: Polyplastics Co., Ltd., Tokyo (JP)

(72) Inventors: Katsuhei Ohnishi, Fuji (JP); Tatsuya Kanezuka, Fuji (JP)

(73) Assignee: POLYPLASTICS CO., LTD., Tokyo (JP)

(*) Notice: Subject to any disclaimer, the term of this patent is extended or adjusted under 35 U.S.C. 154(b) by 0 days.

(21) Appl. No.: 17/049,750

(22) PCT Filed: Apr. 25, 2019

(86) PCT No.: PCT/JP2019/017676
§ 371 (c)(1),
(2) Date: Oct. 22, 2020

(87) PCT Pub. No.: WO2019/208708
PCT Pub. Date: Oct. 31, 2019

(30) Foreign Application Priority Data

Apr. 27, 2018 (JP) .............................. JP2018-086942

(51) Int. Cl.
*C08L 81/02* (2006.01)
*B32B 15/08* (2006.01)
(Continued)

(52) U.S. Cl.
CPC ........ *C08L 81/02* (2013.01); *B29C 45/14336* (2013.01); *B29C 45/2708* (2013.01);
(Continued)

(58) Field of Classification Search
CPC ...... C08K 2201/003; C08K 7/02; C08K 7/04; C08L 81/02
See application file for complete search history.

(56) References Cited

U.S. PATENT DOCUMENTS

| | | | | |
|---|---|---|---|---|
| 2010/0113671 A1* | 5/2010 | Kinouchi | ............... | G06K 19/04 524/425 |
| 2016/0208081 A1 | 7/2016 | Peng et al. | | |
| 2019/0322867 A1 | 10/2019 | Ohnishi et al. | | |

FOREIGN PATENT DOCUMENTS

| CN | 106147230 A | 11/2016 |
|---|---|---|
| JP | 2000263586 A * | 9/2000 |

(Continued)

OTHER PUBLICATIONS

International Search Report dated Jul. 9, 2019, issued in counterpart International Application No. PCT/JP2019/017676. (2 pages).

(Continued)

*Primary Examiner* — Michael M Dollinger
(74) *Attorney, Agent, or Firm* — Westerman, Hattori, Daniels & Adrian, LLP (57) ABSTRACT

A polyarylene sulfide-based resin composition is disclosed containing a polyarylene sulfide-based resin A, an inorganic filler B, and olefinic copolymers C and D each having predetermined structural units, wherein: the inorganic filler B contains a fibrous inorganic filler B1 having a different diameter ratio of 1.5 or less and a fibrous inorganic filler B2 having a different diameter ratio of 3.0 or more; a mass ratio B1/B2 of the fibrous inorganic filler B1 and the fibrous inorganic filler B2 is 0.2 or more and 5.0 or less; and the contents of the olefinic copolymers C and D are respectively 3 parts by mass or more and less than 19 parts by mass and 3 parts by mass or more and 30 parts by mass or less with respect to 100 parts by mass of the polyarylene sulfide-based resin A.

7 Claims, 2 Drawing Sheets

(51) Int. Cl.
  *B29C 45/14* (2006.01)
  *B29C 45/27* (2006.01)
  *B29K 705/00* (2006.01)
  *B29K 81/00* (2006.01)

(52) U.S. Cl.
  CPC .......... *B32B 15/08* (2013.01); *B29K 2081/00* (2013.01); *B29K 2705/00* (2013.01); *C08L 2205/03* (2013.01)

(56) References Cited

FOREIGN PATENT DOCUMENTS

| | | |
|---|---|---|
| JP | 2001-316587 A | 11/2001 |
| JP | 2002-129014 A | 5/2002 |
| JP | 2003-176410 A | 6/2003 |
| JP | 2005-161693 A | 6/2005 |
| JP | 2005-306926 A | 11/2005 |
| JP | 2006-328291 A | 12/2006 |
| JP | 2008-75049 A | 4/2008 |
| JP | 2009-30030 A | 2/2009 |
| JP | 2010-53350 A | 3/2010 |
| JP | 2011026439 A * | 2/2011 |
| JP | 2011-173946 A | 9/2011 |
| JP | 2016-188289 A | 11/2016 |
| JP | 2016-535147 A | 11/2016 |
| JP | 2017-88688 A | 5/2017 |
| WO | 2014/103814 A1 | 7/2014 |
| WO | 2018/079704 A1 | 5/2018 |
| WO | 2018/105437 A1 | 6/2018 |
| WO | 2018/198850 A1 | 11/2018 |
| WO | 2019/208706 A1 | 10/2019 |
| WO | 2019/208709 A1 | 10/2019 |

OTHER PUBLICATIONS

Decision to Refusal dated Apr. 22, 2020, issued in counterpart of Japanese Patent Application No. 2019-556283, with English Translation. (4 pages).

Notice of Reasons for Refusal dated Oct. 6, 2020, issued in counterpart of Japanese Patent Application No. 2019-556283, with English Translation. (4 pages).

* cited by examiner

POLYARYLENE SULFIDE-BASED RESIN COMPOSITION AND INSERT-MOLDED PRODUCT

TECHNICAL FIELD

The present invention pertains to a polyarylene sulfide-based resin composition and insert-molded product.

BACKGROUND ART

Insert-molded products are molded products in which an insert member comprising metal, an inorganic solid, etc. and a resin member comprising a thermoplastic resin composition are integrally molded and are applied to wide fields such as automobile components, electrical and electronic components, OA equipment components, etc. However, the thermal expansion coefficients and contraction coefficients due to temperature changes of the metal, etc. and thermoplastic resin compositions that constitute insert-molded products differ greatly, so there are cases of insert-molded products breaking due to temperature changes during use. Therefore, insert-molded products require high and low temperature impact properties (thermal shock resistance).

Among thermoplastic resins, polyarylene sulfide-based resins are known as resins with comparatively superior thermal shock resistance. However, polyarylene sulfide-based resins have poor toughness and are brittle, so there are cases of thermal shock resistance falling when the structure of an insert member is complex and a resin member has portions with large changes in thickness as in components of, for example, power modules, reactors, and the like used in hybrid electric vehicles (HEVs) and when there are large high/low temperature changes in the environment in which an insert member is used, such as components around automobile engines. As a method to solve these problems, there is the technique of blending a fibrous filler having a flat cross-sectional shape with a polyarylene sulfide-based resin (Patent Document 1).

Further, polyarylene sulfide-based resins are crystalline resins and thus have so-called contraction coefficient anisotropy in which the contraction coefficient of the resin in a cooling process differs between the flow direction of the resin and a direction perpendicular thereto. Due to such contraction coefficient anisotropy, there are cases of warping and sinking occurring in obtained insert-molded products and dimensional accuracy falling. As a method to suppress the occurrence of sinking, there is the technique of blending a fibrous reinforcing agent having a flat cross-sectional shape with a substantially linear polyarylene sulfide resin having a specific Na content and a resin pH in a specific range (Patent Document 2).
Patent Document 1: JP 2005-161693 A
Patent Document 2: JP 2006-328291 A

SUMMARY OF INVENTION

Technical Problem

The present invention addresses the problem of providing a polyarylene sulfide-based resin composition with excellent thermal shock resistance, low warpage property, and flowability and an insert-molded product using the same.

Solution to Problem

In the research process, the present inventors discovered that, by combining and blending an olefinic copolymer and, as an inorganic filler to be blended alongside, fibrous fillers having respectively predetermined and different diameter ratios that are different from each other with a polyarylene sulfide-based resin, superior thermal shock resistance can be maintained even when used in a resin member of an insert-molded product having a structure in which thermal shock resistance readily declines and furthermore, low warpage property can simultaneously be achieved. Additionally, there are cases in which moldability declines due to flowability of the resin falling according to the type or combination of inorganic fillers included in the composition, but the present inventors found that superior thermal shock resistance can be achieved while suppressing the decline of flowability of a resin composition by combining and using a plurality of olefinic copolymers that have predetermined compositions in the discovered blend of inorganic fillers, completing the present invention.

That is, the polyarylene sulfide-based resin composition according to the present invention contains a polyarylene sulfide-based resin A, an inorganic filler B, an olefinic copolymer C, and an olefinic copolymer D, wherein: the inorganic filler B contains a fibrous inorganic filler B1 having a different diameter ratio of 1.5 or less and a fibrous inorganic filler B2 having a different diameter ratio of 3.0 or more, the different diameter ratio being a ratio of the long diameter and the short diameter of a cross section perpendicular to the longitudinal direction; a mass ratio B1/B2 of the fibrous inorganic filler B1 and the fibrous inorganic filler B2 is 0.2 or more and 5.0 or less; the olefinic copolymer C contains an α-olefin-derived structural unit and an α,β-unsaturated acid glycidyl ester-derived structural unit; the olefinic copolymer D contains at least one olefinic copolymer selected from the group consisting of an ethylene-α-olefinic copolymer D1 and an olefinic copolymer D2 containing an α-olefin-derived structural unit and an α,β-unsaturated carboxylic acid alkyl ester-derived structural unit; the content of the olefinic copolymer C is 3 parts by mass or more and less than 19 parts by mass with respect to 100 parts by mass of the polyarylene sulfide-based resin A; and the content of the olefinic copolymer D is 3 parts by mass or more and 30 parts by mass or less in total with respect to 100 parts by mass of the polyarylene sulfide-based resin A.

In the present invention, the inorganic filler B preferably further contains non-fibrous inorganic filler B3. In the present invention, the total content of the inorganic filler B is more preferably 90 parts by mass or more and 220 parts by mass or less with respect to 100 parts by mass of the polyarylene sulfide-based resin A.

In the present invention, the content of the fibrous inorganic filler B2 is preferably 20 parts by mass or more with respect to 100 parts by mass of the polyarylene sulfide-based resin A and the content of the non-fibrous inorganic filler B3 is preferably 20 parts by mass or more with respect to 100 parts by mass of the polyarylene sulfide-based resin A. The average particle diameter of the non-fibrous inorganic filler B3 is preferably 10 μm or more.

The insert-molded product according to the present invention has an insert member formed using a metal, an alloy, or an inorganic solid and a resin member covering at least a portion of a surface of the insert member and the resin member is formed using the abovementioned polyarylene sulfide-based resin composition.

In the present invention, the resin member can be configured so as to have: at least one brittle portion which extends in a predetermined direction and which comprises one or both of a welded portion in which flow terminals of the resin composition have been joined and a stress-concentrating portion in which stress generated by expansion and contraction concentrates; and a trace of a gate on a surface that extends in a direction approximately perpendicular to the direction in which the at least one brittle portion extends.

Effects of Invention

According to the present invention, a polyarylene sulfide-based resin composition with excellent thermal shock resistance, low warpage property, and flowability and an insert-molded product using the same can be provided.

DESCRIPTION OF EMBODIMENTS

An embodiment of the present invention shall be explained in detail below. The present invention is not limited by the following embodiment and can be carried out with the addition of appropriate modifications so long as the effects of the present invention are not hindered.
[Polyarylene Sulfide-based Resin Composition]

The polyarylene sulfide-based resin composition (hereafter also simply referred to as "resin composition") is a resin composition comprising a resin having a polyarylene sulfide-based resin as a main component. "Having as a main component" means 80% by mass or more, 85% by mass or more, or 90% by mass or more of the resin components. The resin composition according to the present embodiment contains a polyarylene sulfide-based resin A, an inorganic filler B, an olefinic copolymer C, and an olefinic copolymer D.
(Polyarylene Sulfide-Based Resin A)

The polyarylene sulfide-based resin A is a resin having a repeating unit indicated by general formula (I) below.

—(Ar—S)— (I)

(Ar indicates an arylene group.)

The arylene group is not particularly limited and can include, for example, a p-phenylene group, an m-phenylene group, an o-phenylene group, a substituted phenylene group, a p,p'-diphenylenesulfone group, a p,p'-biphenylene group, a p,p'-diphenyleneether group, a p-p'-diphenylenecarbonyl group, a naphthalene group, etc. Among the repeating units indicated by general formula (I) above, the polyarylene sulfide-based resin A can, in addition to a homopolymer using identical repeating units, be made a copolymer comprising heterogeneous repeating units according to the use.

As the homopolymer, those having a p-phenylene group as the arylene group and a p-phenylenesulfide group as the repeating units are preferred. This is because homopolymers having a p-phenylenesulfide group as a repeating unit possess extremely high thermal resistance and display high strength, high toughness, and furthermore, high dimensional stability in wide temperature ranges. Molded products having extremely superior physical properties can be obtained by using such homopolymers.

Copolymers that have a combination of two or more different arylene sulfide groups from among arylene sulfide groups including the abovementioned arylene groups can be used as the copolymer. Thereamong, combinations comprising a p-phenylene sulfide group and an m-phenylene sulfide group are preferred from the viewpoint of obtaining molded products provided with high physical properties such as thermal resistance, moldability, and mechanical properties. Polymers comprising 70 mol % or more p-phenylene sulfide groups are preferable and polymers comprising 80 mol % or more are yet more preferable. The polyarylene sulfide-based resin A having a phenylene sulfide group is a polyphenylene sulfide resin (PPS resin).

According to general manufacturing methods therefor, polyarylene sulfide-based resins A having a molecular structure that is substantially linear and does not have a branched or cross-linked structure and those with a structure having branches or cross-linking are known, but a resin of any of these types is effective in the present embodiment.

The melt viscosity of the polyarylene sulfide-based resin A is preferably 5 Pa·s or more and 50 Pa·s or less and more preferably 7 Pa·s or more and 40 Pa·s or less measured at 310° C. and at a shear rate of 1,216 sec$^{-1}$. When the melt viscosity is 5 Pa·s or more and 50 Pa·s or less, superior thermal shock resistance and favorable flowability can be maintained.

The manufacturing method for the polyarylene sulfide-based resin A is not particularly limited and the resin can be manufactured with conventionally known manufacturing methods. For example, the polyarylene sulfide-based resin A can be manufactured by, after synthesizing a low molecular weight polyarylene sulfide-based resin A, polymerizing at a high temperature in the presence of a publicly known polymerization promoter to increase the molecular weight.
(Inorganic Filler B)

The inorganic filler B contains a fibrous inorganic filler B1 and a fibrous inorganic filler B2 (hereafter also referred to as "inorganic fillers B1 and B2") having respective predetermined different diameter ratios that differ from one another.

"Different diameter ratio" means "the long diameter of a cross section perpendicular to the longitudinal direction (longest linear distance of the cross section)/the short diameter of the cross section (longest linear distance in a direction perpendicular to the long diameter)". "Fibrous" means a shape with a different diameter ratio of 1 or more and 10 or less and an average fiber length (cut length) of 0.01-3 mm. In the present embodiment, the term "fibrous" is distinguished from "tabular" (a shape with a different diameter ratio greater than 10 and an aspect ratio of 1 or more and 500 or less) and "particulate" (a shape with a different diameter ratio of 1 or more and 10 or less and an aspect ratio of 1 or more and 2 or less), which will be discussed below. These shapes are all initial shapes (shapes before melt-kneading). "Aspect ratio" means "longest linear distance in the longitudinal direction/the short diameter of a cross section perpendicular to the longitudinal direction (the longest linear distance in a direction perpendicular to the line with the longest distance in the cross section)". The different diameter ratio and the aspect ratio can both be calculated using a scanning electron microscope and image processing software. Further, manufacturers' values (numerical values that the manufacturer has published in catalogs, etc.) can be employed as the average fiber length (cut length).

The present embodiment contains a combination of a fibrous inorganic filler B1 having a different diameter ratio of 1.5 or less and a fibrous inorganic filler B2 having a different diameter ratio of 3.0 or more. Thereby, even when an insert-molded product has a structure in which thermal shock resistance readily declines, an insert-molded product with excellent thermal shock resistance, excellent low warpage property, and high dimensional precision can be manufactured.

(Fibrous Inorganic Filler B1)

The fibrous inorganic filler B1 is preferably a fibrous inorganic filler having a different diameter ratio of 1.5 or less, preferably 1.0 or more and 1.3 or less. By containing an inorganic filler B1 having such a different diameter ratio, the molding contraction coefficient and the linear expansion coefficient of an insert-molded product can be lowered and the mechanical and physical properties and thermal shock resistance can be improved. For example, general fibrous inorganic fillers in which the cross-sectional shape in a direction perpendicular to the longitudinal direction is round or approximately round can be raised as the inorganic filler B1.

The cross-sectional area of the fibrous inorganic filler B1 is preferably $1\times10^{-5}$ to $1\times10^{-3}$ mm$^2$ and more preferably $2\times10^{-5}$ to $8\times10^{-3}$ mm$^2$ in terms of further enhancing the ease of manufacturing and reinforcing effects. The "cross-sectional area" can be considered to be a value in which, when the longest linear distance of the cross-section of the fibrous inorganic filler B1 measured using a scanning electron microscope and image processing software is set as the long diameter and the shortest linear distance of the cross-section of the fibrous inorganic filler B1 measured in the same manner is set as the short diameter, the value of the long diameter and the short diameter multiplied is further multiplied by $\pi$.

Further, with the objective of lightening the specific weight of the resin composition, etc., hollow fibers can be used as the fibrous inorganic filler B1.

As the fibrous inorganic filler B1, there are mineral fibers such as glass fibers, carbon fibers, zinc oxide fibers, titanium oxide fibers, wollastonite, silica fibers, silica-alumina fibers, zirconia fibers, boron nitride fibers, silicon nitride fibers, boron fibers, and potassium titanate fibers, metal fibrous substances such as stainless steel fibers, aluminum fibers, titanium fibers, copper fibers, and brass fibers, etc. and one or two or more of these can be used. Among these, glass fibers and carbon fibers are preferable.

The fibrous inorganic filler B1 may be surface-treated with various generally known surface treatment agents such as epoxy-based compounds, isocyanate-based compounds, silane-based compounds, titanate-based compounds, and fatty acids. Due to the surface treatment, adhesion with the polyarylene sulfide-based resin A can be improved. A surface treatment agent may be applied to the fibrous inorganic filler B1 in advance before material preparation to perform a surface treatment or a convergence treatment or may be added simultaneously during material preparation.

The content of the fibrous inorganic filler B1 is preferably 10 parts by mass or more and more preferably 20 parts by mass or more and 110 parts by mass or less with respect to 100 parts by mass of the polyarylene sulfide-based resin A in terms of improving mechanical and physical properties and thermal shock resistance.

(Fibrous Inorganic Filler B2)

The fibrous inorganic filler B2 is a fibrous inorganic filler in which the different diameter ratio is 3.0 or more, preferably 3.5 or more, and more preferably 3.8 or more. The upper limit of the different diameter ratio is 10.0 or less, preferably 8.0 or less, and more preferably 6.0 or less. By comprising an inorganic filler B2 having such a different diameter ratio, the anisotropy of the molding contraction coefficient and the linear expansion coefficient of an insert-molded product can be lowered and low warpage property, mechanical and physical properties, and thermal shock resistance can be improved. By combining the fibrous inorganic filler B2 with the fibrous inorganic filler B1, effects in which both thermal shock resistance and low warpage property are established that are superior to those using the fibrous inorganic filler B1 alone or using the fibrous inorganic filler B1 in combination with a non-fibrous inorganic filler (for example, non-fibrous inorganic filler B3 discussed below) and/or another fibrous inorganic filler (for example, fibrous inorganic filler B4 discussed below) can be obtained.

Fibrous inorganic fillers having a cross-sectional shape perpendicular to the longitudinal direction such as an elliptical shape, an oval shape, a semicircular shape, a cocoon shape, a rectangular shape, or a shape similar thereto can be raised as the fibrous inorganic filler B2. A "cocoon shape" is a shape in which the central vicinity of an oval in the longitudinal direction is inwardly recessed.

The cross-sectional area of the fibrous inorganic filler B2 is preferably $1\times10^{-5}$ to $1\times10^{-3}$ mm$^2$ and more preferably $1\times10^{-4}$ to $5\times10^{-4}$ mm$^2$ in terms of further enhancing ease of manufacturing and the effects of the combination with the fibrous inorganic filler B1. The "cross-sectional area" can be considered a value in which, when the longest linear distance of the cross-section of the fibrous inorganic filler B2 measured using a scanning electron microscope and image processing software is set as the long diameter and the shortest linear distance of the fibrous inorganic filler B2 measured in the same manner is set as the short diameter, the value of the long diameter and the short diameter multiplied is further multiplied by $\pi$. The average length of the fibrous inorganic filler B2 is not particularly limited, but considering the mechanical and physical properties, the molding processability, etc. of the molded product, the average fiber length in a molded product is preferably 50-1000 μm. The "average fiber length" is as described above. Similar to the fibrous inorganic filler B1, hollow fibers can also be used as the inorganic filler B2. The material of and surface treatment performed as necessary on the fibrous inorganic filler B2 are also the same as for the fibrous inorganic filler B1 described above and the descriptions are therefore omitted here.

The content of the fibrous inorganic filler B2 is preferably 20 parts by mass or more and more preferably 25 parts by mass or more and 100 parts by mass or less with respect to 100 parts by mass of the polyarylene sulfide-based resin A in terms of further improving the thermal shock resistance by further enhancing the effects of combination with the inorganic filler B1.

The content ratio of the inorganic fillers B1 and B2 is, as a mass ratio B1/B2 of the inorganic fillers B1 and B2, 0.2 or more and 5.0 or less, preferably 0.3 or more and 4.0 or less, more preferably 0.4 or more and 4.0 or less, and still more preferably 0.4 or more and 3.8 or less. By setting B1/B2 to 0.2 or more and 5.0 or less, a resin composition with both superior thermal shock resistance and low warping can be obtained.

(Other Fillers)

The inorganic filler B can contain other inorganic fillers, as necessary, in addition to inorganic fillers B1 and B2 described above in order to improve dimensional stability, suppress the generation of metal-corroding gas, etc. The other fillers can include a non-fibrous inorganic filler B3, another fibrous inorganic filler B4 with a different diameter ratio that is different from those of inorganic fillers B1 and B2 described above, etc. These other fillers can also be surface treated as described above.

The non-fibrous inorganic filler B3 can include particulate inorganic fillers, tabular inorganic fillers, etc. As described above, "particulate" means a shape with a different diameter ratio of 1 or more and 10 or less and an aspect ratio of 1 or more and 2 or less and "tabular" means a shape with a different diameter ratio greater than 10 and an aspect ratio of 1 or more and 500 or less.

Among non-fibrous inorganic fillers B3, particulate inorganic fillers can include carbon black, silica, quartz powder, glass beads, glass powder, talc (particulate), silicates such as calcium silicate, aluminum silicate, and diatomaceous earth, metal oxides such as iron oxide, titanium oxide, zinc oxide, and alumina, metal carbonates such as calcium carbonate and magnesium carbonate, metal sulfates such as calcium sulfate and barium sulfate, and, additionally, silicon carbide, silicon nitride, boron nitride, various metal powders, etc. Among these, calcium carbonate and glass beads can preferably be used.

Among non-fibrous inorganic fillers B3, for example, glass flakes, talc (tabular), mica, kaolin, clay, alumina, various metal foils, etc. can be raised as tabular inorganic fillers. Among these, glass flakes and talc can preferably be used. With objectives such as improving dimensional accuracy and improving mechanical and physical properties, two or more of the abovementioned inorganic fillers can be mixed and used in the non-fibrous inorganic filler B3.

When the non-fibrous inorganic filler B3 is a particulate filler, the average particle diameter (50% d) thereof in its initial shape (the shape before melt-kneading) is preferably 10 μm or more, more preferably 12 μm or more, and yet more preferably 15 μm or more in terms of further improving mechanical strength and thermal shock resistance. Further, the upper limit is preferably 50 μm or less, more preferably 45 μm or less, and yet more preferably 40 μm or less. When the non-fibrous inorganic filler B3 is a tabular filler, the average particle diameter thereof in its initial shape (the shape before melt-kneading) is preferably 10 μm or more and 100 μm or less, more preferably 15 μm or more and 900 μm or less, and particularly preferably 20 μm and 800 μm or less. The average particle diameter (50% d) means the median diameter of the 50% integral value in a particle size distribution measured with a laser diffraction/scattering method.

The amount of the non-fibrous inorganic filler B3 blended is preferably 20 parts by mass or more and more preferably 25 parts by mass or more with respect to 100 parts by mass of the polyarylene sulfide-based resin A in terms of improving mechanical strength and thermal shock resistance. In particular, the contents of the abovementioned fibrous inorganic filler B2 and the non-fibrous inorganic filler B3 both are preferably 20 parts by mass or more, more preferably 22 parts by mass or more, and particularly preferably 25 parts by mass or more with respect to 100 parts by mass of the polyarylene sulfide-based resin A. When the contents of the fibrous inorganic filler B2 and the non-fibrous inorganic filler B3 are both 20 parts by mass or more with respect to 100 parts by mass of the polyarylene sulfide-based resin A, more superior thermal shock resistance can be attained even when an insert-molded product has a structure in which thermal shock resistance readily declines. The upper limit of the amount of the non-fibrous inorganic filler B3 blended is preferably a mass ratio of 80 or less and more preferably 65 or less with the polyarylene sulfide-based resin A in terms of suppressing the lowering of mechanical and physical properties.

The other fibrous inorganic filler B4 can include fibrous inorganic fillers in which the different diameter ratio exceeds 1.5 or is 1.6 or more and less than 3.0. The material of the fibrous inorganic filler B4 is the same as that of the fibrous inorganic fillers B1 and B2 described above and the descriptions are therefore omitted here.

The total content of the inorganic filler B is preferably 90 parts by mass or more and 220 parts by mass or less, more preferably 100 parts by mass or more and 200 parts by mass or less, and particularly preferably 110 parts by mass or more and 180 parts by mass or less with respect to 100 parts by mass of the polyarylene sulfide resin A in terms of causing the effects due to the combination of the abovementioned inorganic fillers B1 and B2 to be exhibited while maintaining the properties of the polyarylene sulfide-based resin A.

(Olefinic Copolymer C)

The olefinic copolymer C contains an α-olefin-derived structural unit and an α,β-unsaturated acid glycidyl ester-derived structural unit as copolymer components. Because the composition contains such an olefinic copolymer C, the thermal shock resistance of insert-molded products can be enhanced remarkably. Among these, the olefinic copolymer C is preferably an olefinic copolymer that further contains a (meth)acrylic acid ester-derived structural unit. The olefinic copolymer may be used alone or in a combination of two or more. Below, (meth)acrylic acid ester is also referred to as (meth)acrylate. For example, (meth)acrylic acid glycidyl ester is also referred to as glycidyl (meth)acrylate. Further, in the present specification "(meth)acrylic acid" means both acrylic acid and methacrylic acid and "(meth)acrylate" means both acrylate and methacrylate.

The α-olefin is not particularly limited and can include, for example, ethylene, propylene, butylene, 1-pentene, 1-hexene, 1-heptene, 1-octene, 4-methyl-1-pentene, 4-methyl-1-hexene, etc. Among these, ethylene is preferable. One or two or more selected from the substances described above can be used as the α-olefin. The content of copolymer components derived from the α-olefin is not particularly limited and, for example, can be 1% by mass or more and 8% by mass or less in the entire resin composition.

For example, the α,β-unsaturated acid glycidyl ester can include substances having the structure indicated by general formula (II) below.

[Chem. 1]

($R_1$ is hydrogen, or an alkyl group with a carbon number of one or more and 10 or less.)

For example, compounds indicated by general formula (II) above can include acrylic acid glycidyl esters, methacrylic acid glycidyl esters, ethacrylic acid glycidyl esters, etc. Among these, methacrylic acid glycidyl esters are preferred. An α,β-unsaturated acid glycidyl ester can be used alone and two or more can also be used in combination. The content of the copolymer components derived from α,β-unsaturated acid glycidyl esters is preferably 0.05% by mass or more and 0.6% by mass or less in the entire resin composition. When the content of the copolymer components derived from α,β-unsaturated acid glycidyl esters is in this range, deposition of mold deposits can be suppressed while maintaining thermal shock resistance.

The (meth)acrylic acid ester is not particularly limited and can include, for example, acrylic acid esters such as methyl acrylate, ethyl acrylate, n-propyl acrylate, isopropyl acrylate, n-butyl acrylate, n-hexyl acrylate, isobutyl acrylate, n-amyl acrylate, and n-octyl acrylate; and methacrylic acid esters such as methyl methacrylate, ethyl methacrylate, n-propyl methacrylate, isopropyl methacrylate, n-butyl methacrylate, n-hexyl methacrylate, isobutyl methacrylate, n-amyl methacrylate, and n-octyl methacrylate. Among these, methyl acrylate is preferred. A (meth)acrylic acid ester can be used alone two or more can also be used in combination. The content of the copolymer components derived from (meth)acrylic acid esters is not particularly limited, but can be, for example, 0.5% by mass or more and 3% by mass or less in the entire resin composition.

Olefinic copolymers comprising an α-olefin-derived structural unit and an α,β-unsaturated glycidyl ester-derived structural unit and olefinic copolymers further comprising a (meth)acrylic acid ester-derived structural unit can be manufactured by copolymerizing with conventionally known methods. For example, the abovementioned olefinic copolymers can be obtained by performing commonly known copolymerization with a radical polymerization reaction. The type of the olefinic copolymer is not particularly questioned, but for example, may be a random copolymer or may be a block copolymer. Further, the above olefinic copolymer may be an olefinic grafted copolymer in which, for example, polymethyl methacrylate, polyethyl methacrylate, polymethyl acrylate, polyethyl acrylate, polybutyl acrylate, poly 2-ethylhexyl acrylate, polystyrene, polyacrylonitrile, an acrylonitrile-styrene copolymer, a butyl acrylate-styrene copolymer, etc. are chemically bonded to the olefinic copolymer with a branched or cross-linked structure.

The olefinic copolymer C used in the present embodiment can contain other copolymer component-derived structural units so long as the effects of the present invention are not hindered.

More specifically, as the olefinic copolymer C, there are, for example, glycidyl methacrylate-modified ethylenic copolymers, glycidyl ether-modified ethylenic copolymers, etc. and among these, glycidyl methacrylate-modified ethylenic copolymers are preferred.

As glycidyl methacrylate-modified ethylenic copolymers, there are glycidyl methacrylate graft-modified ethylenic copolymers, ethylene-glycidyl methacrylate copolymers, ethylene-glycidyl methacrylate-methyl acrylate copolymers, ethylene glycidyl methacrylate-ethyl acrylate copolymers, ethylene-glycidyl methacrylate-propyl acrylate copolymers, ethylene-glycidyl methacrylate-butyl acrylate copolymers, etc. Among these, because particularly superior metal-resin composite molded bodies are obtained, ethylene-glycidyl methacrylate copolymers and ethylene-glycidyl methacrylate-methyl acrylate copolymers are preferred and ethylene-glycidyl methacrylate-methyl acrylate copolymers are particularly preferred. "BONDFAST" (manufactured by Sumitomo Chemical, Co., Ltd.), etc. can be included as specific examples of ethylene-glycidyl methacrylate copolymers and ethylene-glycidyl methacrylate-methyl acrylate copolymers.

For example, glycidyl ether graft-modified ethylene copolymers, glycidyl ether-ethylene copolymers, etc. can be included as glycidyl ether-modified ethylene copolymers.

The content of the olefinic copolymer C is 3 parts by mass or more and less than 19 parts by mass with respect to 100 parts by mass of the polyarylene sulfide-based resin A and from the viewpoint of thermal shock resistance, the content is preferably 5 parts by mass or more, more preferably 7 parts by mass or more, and yet more preferably 9 parts by mass or more with respect to 100 parts by mass of the polyarylene sulfide-based resin. Meanwhile, from the viewpoint of flowability, the content of the olefinic copolymer C is preferably less than 19 parts by mass, more preferably 18 parts by mass or less, and yet more preferably 17 parts by mass or less with respect to 100 parts by mass of the polyarylene sulfide-based resin A.

(Olefinic Copolymer D)

The olefinic copolymer D comprises one or more olefinic copolymers selected from the group consisting of olefinic copolymer D1 and olefinic copolymer D2 described below. By containing not only the olefinic copolymer C, but the olefinic copolymer D, the polyarylene sulfide-based resin composition of the present embodiment can have a certain flowability as a resin composition while the thermal shock resistance of insert-molded products is enhanced.

The content of the olefinic copolymer D is 3 parts by mass or more and 30 parts by mass or less, more preferably 5 parts by mass or more and 25 parts by mass or less, and yet more preferably 6 parts by mass or more and 20 parts by mass or less in total with respect to 100 parts by mass of the polyarylene sulfide-based resin A.

(Olefinic Copolymer D1)

The olefinic copolymer D1 contains ethylene and an α-olefin as copolymer components. In the olefinic copolymer D1, the carbon number of the α-olefin is preferably 3-20, more preferably 5-20, and yet more preferably 5-15. The olefinic copolymer D1 may be a random copolymer or a block copolymer. The olefinic copolymer D1 may be a copolymer comprising 5-95% by mass ethylene and 5-95% by mass of the α-olefin. As specific examples of the olefinic copolymer D1, there are ethylene-octene (EO) copolymers, ethylene-propylene copolymers, ethylene-butylene copolymers, ethylene-pentene copolymers, ethylene-hexene copolymers, ethylene-heptene copolymers, etc. and furthermore, these copolymers can be mixed and used.

(Olefinic Copolymer D2)

The olefinic copolymer D2 contains an α-olefin-derived structural unit and an α,β-unsaturated carboxylic acid alkylene ester-derived structural unit as copolymer components and may be a random, block, or graft copolymer and the copolymer may be modified by at least one selected from the group consisting of unsaturated carboxylic acids, acid anhydrides thereof, and derivatives thereof. The α-olefin in the olefinic copolymer D2 is not particularly limited, but as examples thereof, there are, for example, ethylene, propylene, butylene, 1-pentene, 1-hexene, 1-heptene, 1-octene, 4-methyl-1-pentene, 4-methyl-1-hexene, etc. Among these, ethylene is preferable. One or more selected from the substances described above can be used as the α-olefin. Methyl acrylate, ethyl acrylate, n-propyl acrylate, isopropyl acrylate, n-butyl acrylate, t-butyl acrylate, isobutyl acrylate, 2-ethylhexyl acrylate, hydroxyethyl acrylate, methyl methacrylate, ethyl methacrylate, n-propyl methacrylate, isopropyl methacrylate, n-butyl methacrylate, t-butyl methacrylate, isobutyl methacrylate, 2-ethylhexyl methacrylate, hydroxyethyl methacrylate, etc. can be used as the α,β-unsaturated carboxylic alkyl ester in the olefinic copolymer D2.

Acrylic acid, methacrylic acid, maleic acid, fumaric acid, itaconic acid, crotonic acid, methyl maleic acid, methyl fumaric acid, mesaconic acid, citraconic acid, glutaconic acid, monomethyl maleate, monoethyl maleate, monoethyl fumarate, methyl itaconate, methyl maleic anhydride, maleic anhydride, methyl maleic anhydride, citraconic anhydride, etc. are examples of the unsaturated carboxylic acid or anhydride thereof used as a modifier and one or two or more of these is used.

As specific examples of the olefinic copolymer D2, there are copolymers of ethylene and a (meth)acrylic acid ester such as ethylene ethyl acrylate (EEA) copolymers, ethylene methyl methacrylate copolymers, etc.

The content of the olefinic copolymer C and the content of the olefinic copolymer D are not particularly limited so long as they are within specified ranges, but from the viewpoint of thermal shock resistance, the content of the olefinic copolymer C is preferably the same as or greater than the content of the olefinic copolymer D.

Further, of the olefinic copolymer D1 and the olefinic copolymer D2, it is more preferable that the olefinic copolymer D2 be used as the olefinic copolymer D.

(Other Additives, Etc.)

Publicly known additives generally added to thermoplastic resins and thermosetting resins, that is, burr suppressing agents, mold release agents, lubricants, plasticizers, flame retardants, colorants such as dyes and pigments, crystallization accelerators, nucleating agents, various antioxidants, thermal stabilizers, weatherproofing stabilizers, anti-corrosion agents, etc. can be blended with the resin composition in accordance with the desired performance so long as the effects of the invention are not hindered in order to impart desired properties in accordance with the objective thereof. Burr suppressing agents can include, for example, branched type polyphenylene sulfide-based resins, silane compounds, etc. with extremely high melt viscosities as described in WO 2006/068161 A, WO 2006/068159 A, etc. Silane compounds include various types such as vinylsilane, methacryloxysilane, epoxysilane, aminosilane, and mercaptosilane and while, for example, vinlytrichlorosilane, γ-methacryloxypropyltrimethoxysilane, γ-glycidoxypropyltrimethoxysilane, γ-aminopropyltriethoxysilane, γ-mercaptotrimethoxysilane, etc. are listed, silane compounds are not limited thereto. The content of the additives can be set to, for example, 5% by mass or less in the entire resin composition.

Further, in addition to the abovementioned components, a small amount of another thermoplastic resin component can also be supplementally used in combination in the resin composition in accordance with the objective thereof. The other thermoplastic resin used here may be any resin that is stable at high temperatures. For example, this can include aromatic polyesters that comprise an aromatic dicarboxylic acid and a diol or an oxycarboxylic acid, etc., such as polyethylene terephthalate and polybutylene terephthalate, polyamides, polycarbonates, ABS, polyphenylene oxides, polyalkyl acrylates, polysulfones, polyethersulfones, polyetherimides, polyetherketones, fluororesins, etc. Further, two or more of these thermoplastic resins can be mixed and used. The content of the other thermoplastic resin component can be set to, for example, 20% by mass or less, 15% by mass or less, or 10% by mass or less in the entire resin composition.

Preparation of the resin composition can easily be carried out using equipment and methods that are commonly used as conventional methods for resin composition preparation. For example, any of 1) methods for, after components are mixed, preparing pellets by kneading and extruding with a single- or twin-screw extruder and then molding, 2) methods for, first preparing pellets of a different composition, mixing a pre-determined amount of the pellets and molding, and then obtaining a molded product of the objective composition, 3) methods for directly introducing one or more components in a molding machine, etc. can be used. Further, methods for setting part of the resin components as a fine powder and adding this part to the other components and mixing are preferred methods to achieve a uniform blend of these components.

The polyarylene sulfide-based resin composition of the present embodiment is a resin composition with excellent thermal shock resistance, low warpage property, and flowability and by making use of these properties, the composition is useful in various applications. Among these, the composition is especially preferably used for automobile/vehicle-related insert members that have structures that are complicated and have portions with large changes in thickness or are used in environments with large high/low temperature changes. As automobile/vehicle-related components, there are components around engines, drive system components, cooling system components, etc. As components around engines, there are inverter cases, current sensors, capacitor cases, reactors, bus bar components, etc. in hybrid electric vehicles (HEVs). As drive system components, there are motor insulators, rotation sensors, etc. As cooling system components, there are water pumps, oil pumps, flow control units, etc. Among these, application to inverter cases, current sensors, reactors, and bus bar components is preferred.

[Insert-Molded Product]

Figure 1A:
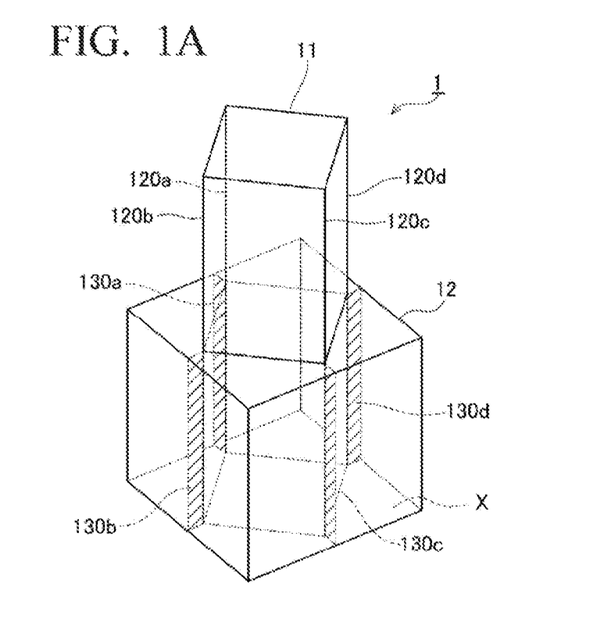
FIGS. 1A and 1B schematically show one embodiment of the insert-molded product, wherein A is a perspective view and B is a plan view.
Figure 1B:
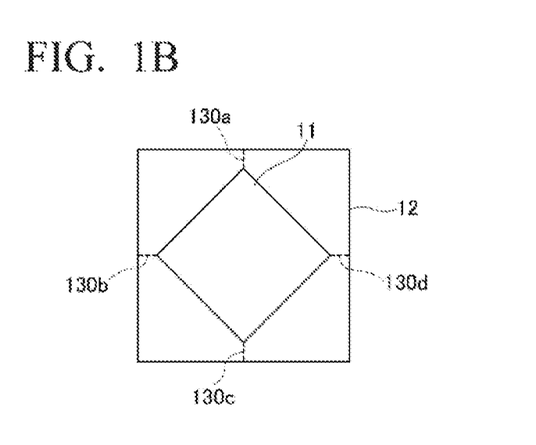

FIGS. 1A and 1B show an example of an insert-molded product according to the present embodiment schematically. A is a perspective view and B is a plan view of A. As shown in FIG. 1A, an insert-molded product 1 has an insert member 11 and a resin member 12 that covers at least a portion of a surface of the insert member. The insert member 11 is formed from a metal, an alloy, or an inorganic solid, is a rectangular column having four corner portions 120a-d, and is partially embedded in the resin member 12. The resin member 12 is formed from the abovementioned polyarylene sulfide-based resin composition and has four brittle portions 130a-d comprising welded portions and stress-concentrating portions. The brittle portions 130a-d are formed in an approximately rectangular shape so as to extend in a predetermined direction. The brittle portions 130a-d may be configured consisting only of either the welded portions or the stress-concentrating portions.

The "stress-concentrating portions" are portions that concentrate stress generated by expansion and contraction of the resin composition. The stress-concentrating portions can include, for example, corner portions, cutout portions, damaged portions, through holes, punched portions, thin portions, locations with large changes in thickness, flow mark portions, etc. One or more stress-concentration portions may be formed. The corner portions 120a-d of the rectangular columnar insert member 11 in the insert-molded product 1 shown in FIG. 1A are disposed so as to point toward side surfaces of the resin member 12. In addition, a distanced between the tips of the corner portions (sharp corners) of the insert member 11 and the side surfaces of the resin member 12 is roughly 1 mm and the vicinities thereof are thin stress-concentrating portions 130a-d. As shown by the regions drawn with hatched lines, the brittle portions 130a-d are configured in an approximately rectangular shape from the ridge lines of the regions of the corner portions 120a-d of the insert member 1 embedded in the resin member 12 to the side surfaces of the resin member 12.

Figure 2:
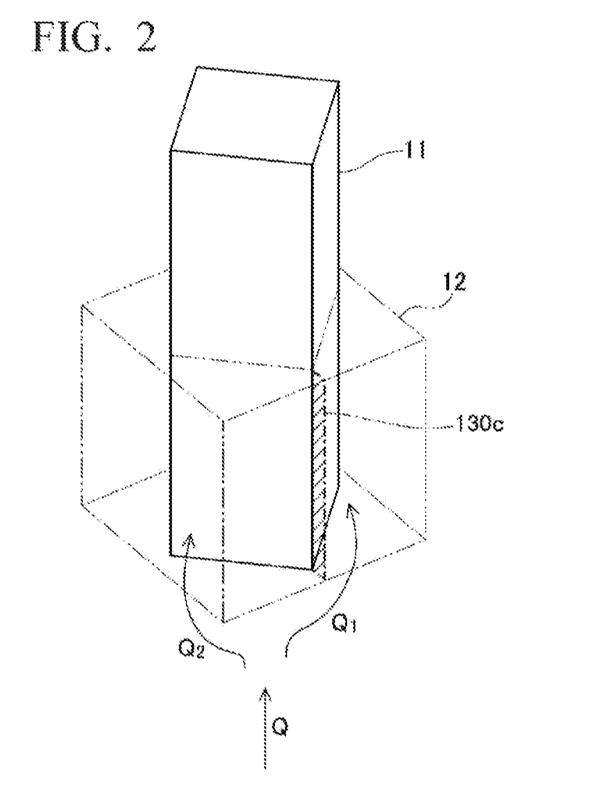
FIG. 2 schematically shows a state in which a welded portion is formed.

The "welded portions" are portions where flow terminals of the resin composition are bonded (welded). The mechanical strength of welded portions tends to deteriorate more than that at other locations. How the welds are formed shall be explained, referring to FIGS. 1A, 1B, and 2. The insert-molded product 1 is manufactured in a mold having a gate in a bottom surface X side and therefore has a trace of a gate on the bottom surface X, which is not illustrated. When injection molding the insert-molded product 1, the resin composition is injected into the cavity of the mold from the mold gate (not illustrated) in the bottom surface X side of the insert-molded product 1, as shown in FIGS. 1A, 1B, and 2. Injected resin stream Q branches into multiple resin streams $Q_1$, $Q_2$ with the bottom surface of the insert member 11 as the origin. The resin streams $Q_1$, $Q_2$ respectively flow along the side surfaces of the insert member 11 and, at the ridge line portions of the corner portions 120a-d of the insert member 11, rejoin at an angle in which respective angles of attack $\theta_1$, $\theta_2$ are less than 90° with respect to the ridge lines (for example, 0° or more and 45° or less) and are bonded at this interface. These bond portions become welded portions and constitute the brittle portions 130a-d. In FIG. 2, for convenience of explanation, only the brittle portion 130c is illustrated, but each of the brittle portions 130a-d is formed in a rectangular shape from each ridge line of the corner portions 120a-d of the insert member 1 to the side surfaces of the resin member 12. In the insert-molded product 1, the positions at which the welded portions and the stress-concentrating portions match and the brittle portions 130a-d are formed so as to comprise both the welded portions and the stress-concentrating portions.

The insert-molded product 1 formed as described above has at least one of the brittle portions 130a-d extending in a predetermined direction and has a trace of a gate on a surface X extending in a direction approximately perpendicular to the direction in which the at least one of the brittle portions 130a-d extends. "Approximately perpendicular" means an angle of approximately 75° to 105°, including a right angle. Due to the insert-molded product 1 having a resin member comprising the resin composition as in the present embodiment, declines in thermal shock resistance are prevented even in an insert-molded product having such a structure and an insert-molded product having excellent thermal shock resistance can be configured. Further, dimensional accuracy can also be enhanced by simultaneously achieving low warpage property.

The metal, alloy, or inorganic solid constituting the insert member 11 is not particularly limited, but is preferably a substance that will not deform or melt when contacting the resin during molding. For example, these can include metals such as aluminum, magnesium, copper, and iron, alloys of said metals such as brass, and inorganic solids such as glass, ceramics, etc.

The manufacturing method for the insert-molded product is not particularly limited and, for example, the abovementioned resin composition and an insertmember formed in a desired shape beforehand can be insert molded. Insert molding can be, for example, composite molding by fitting an insert member in a mold ahead of time and filling the outside thereof with the abovementioned resin composition by injection molding, extrusion-compression molding, etc. The shape and size of the insert-molded product are not particularly limited.

EXAMPLES

The present invention will be explained more specifically by showing the following examples, but the interpretation of the present invention is not limited thereby.

Examples 1-9 and Comparative Examples 1-10

Using the materials indicated below, polyarylene sulfide-based resins, inorganic fillers, and olefinic copolymers were dry blended with the compositions and at the content ratios shown in Table 1. Resin composition pellets of the examples and comparative examples were obtained by feeding these to a twin-screw extruder with a cylinder temperature of 320° C. and melt-kneading.

(Polyarylene Sulfide-Based Resin)

Polyarylene Sulfide-based Resin A: Polyphenylene sulfide (PPS) resin, "Fortron KPS" manufactured by KUREHA CORPORATION (melt viscosity: 20 Pa·s (shear rate: 1,216 $sec^{-1}$, 310° C.))

(Measurement of Melt Viscosity of the Polyarylene Sulfide-Based Resin)

The melt viscosity of the abovementioned polyarylene sulfide-based resin A was measured as follows.

Using a capillograph manufactured by Toyo Seiki Sei-saku-sho, Ltd., the melt viscosity was measured at a barrel temperature of 310° C. and a shear rate of 1,216 $sec^{-1}$ using a 1 mm ø×20 mmL/flat die as the capillary.

(Inorganic Fillers)

Fibrous Inorganic Filler B1: Glass fibers, approximately round cross section, long diameter: 10.5 µm, short diameter: 10.5 µm, long diameter/short diameter ratio: 1.0, "Chopped Strands ECS03T-747H" manufactured by Nippon Electric Glass Co., Ltd.

Fibrous Inorganic Filler B2: Glass fibers, elliptical cross section, long diameter: 28 µm, short diameter: 7 µm, long diameter/short diameter ratio: 4.0, "Chopped Strand with Modified Cross Section CSG 3PA-830" manufactured by Nitto Boseki Co, Ltd.

Fibrous Inorganic Filler: Glass fibers, elliptical cross section, long diameter: 20 µm, short diameter: 10 µm, long diameter/short diameter ratio: 2.0, "Chopped Strand with Modified Cross Section CSG 3PL-962" manufactured by Nitto Boseki Co, Ltd.

Fibrous Inorganic Filler: Glass fibers, cocoon-shaped cross section, long diameter: 24 µm, short diameter: 12 µm, long diameter/short diameter ratio: 2.0, "Chopped Strand with Modified Cross Section CSH 3PA-860" manufactured by Nitto Boseki Co, Ltd.

Non-fibrous Inorganic Filler B3: Calcium carbonate, average particle diameter (50% d): 25 µm, "MC-35W" manufactured by ASAHI KOHMATSU CO., LTD.

(Olefinic Copolymers)

Olefinic Copolymer C: "BONDFAST 7M" manufactured by Sumitomo Chemical, Co., Ltd., comprising 67% by mass ethylene, 6% by mass methacrylic acid glycidyl ester, and 27% by mass methyl acrylate as copolymer components.

Olefinic Copolymer D1: Ethylene-octene copolymer, "Engage 8440" manufactured by Dow Chemical Japan Limited Olefinic Copolymer D2: Ethylene-ethyl acrylate copolymer, "NUC-6570" manufactured by NUC CO., LTD.

[Evaluation]

(Flowability)

Using a capillograph manufactured by Toyo Seiki Sei-saku-sho, Ltd., the melt viscosity (Pa·s) was measured at a barrel temperature of 310° C. and a shear rate of 1,000 $sec^{-1}$ using a 1 mm ø×20 mmL/flat die as the capillary. The results are shown in Table 1. The flowability is excellent when the melt viscosity is 250 Pa·s or less.

(Thermal Shock Resistance)

Using the resin compositions obtained in the examples and comparative examples and insert members (1.41 cm×1.41 cm×height 2.4 cm rectangular columnar shape) made of S35C as defined by JIS G4051:2005 Carbon Steels for Machine Structural Use and insert injection molding such that the smallest thickness of the resin portion became 1 mm by flowing the resin compositions into a mold from the gate in the surface X side in FIGS. 1A and 1B under conditions of a 320° C. cylinder temperature and a 150° C. mold temperature, insert-molded products 1 as shown in FIGS. 1A and 1B were manufactured and made into test pieces.

Repeating a cycle of cooling the test pieces at −40° C. for 1.5 hours and heating the test piece at 180° C. for 1.5 hours using a hot-cold shock tester (manufactured by ESPEC CORP.), the brittle portions were observed every 20 cycles. The number of cycles when cracks arose in the brittle portions was evaluated as an index of the thermal shock resistance. The results are shown in Table 1. The thermal shock resistance is excellent when the number of cycles was 150 or more and the thermal shock resistance is particularly excellent when the number of cycles was 170 or more.

(Low Warpage Property)

Figure 3:
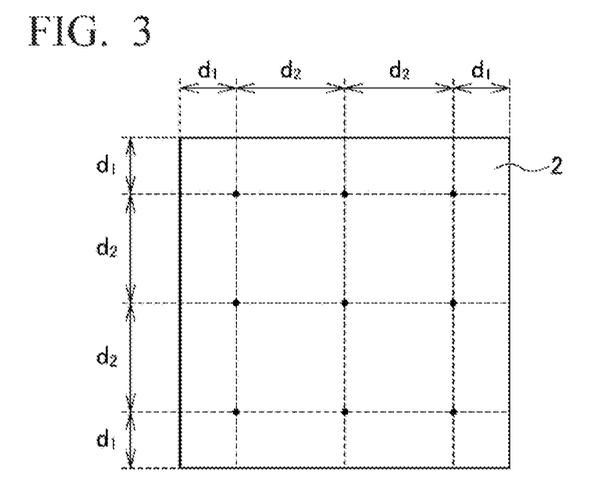
FIG. 3 is an explanatory drawing of the measurement position for low warpage property.

Using the resin compositions obtained in the examples and comparative examples, five 80 mm×80 mm×1.5 mm thick tabular resin molded products 2 were manufactured by injection molding under conditions of a cylinder temperature of 320° C., a mold temperature of 150° C., and a holding pressure of 70 MPa. Placing the first sheet of the tabular resin molded product 2 on a horizontal surface, the height from the horizontal surface was measured at 9 locations on the tabular resin molded product 2 using a CNC image measurement device manufactured by Mitutoyo Corporation (model: QVBHU404-PRO1F) and the average height was calculated from the obtained measurement values. The filled circles in FIG. 3 show the measured locations ($d_1$=3 mm and $d_2$=37 mm). A plane parallel to the horizontal surface of which the height from the horizontal surface is identical to the average height was set as a reference plane. The maximum height and minimum height from the reference plane were selected from the heights measured at the nine locations and the difference between the two was calculated. Similarly, the difference was also calculated for the other four tabular resin molded products and the five values were averaged and set as the amount of warping. The results are shown in Table 1. The lower the amount of warping, the better the low warpage property.

TABLE 1

| Material | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|---|---|---|---|---|
| PPS A | 100 | 100 | 100 | 100 | 100 | 100 | 100 | 100 | 100 | 100 | 100 | 100 | 100 | 100 | 100 | 100 | 100 | 100 | 100 |
| FIBROUS INORGANIC FILLER B1 (DIFFERENT DIAMETER RATIO: 1.0) | 95 | 54 | 54 | 56 | 56 | 59 | 56 | 37 | 107 | 59 | 56 | 54 | 53 | 54 | 54 | — | 158 | — | 100 |
| FIBROUS INORGANIC FILLER B2 (DIFFERENT DIAMETER RATIO: 4.0) | 54 | 41 | 41 | 42 | 42 | 45 | 42 | 61 | 31 | 45 | 42 | 41 | 40 | — | — | 158 | — | — | 14 |
| FIBROUS INORGANIC FILLER (DIFFERENT DIAMETER RATIO: 2.0, CROSS SECTION: OVAL) | — | — | — | — | — | — | — | — | — | — | — | — | — | 41 | — | — | — | — | — |
| FIBROUS INORGANIC FILLER (DIFFERENT DIAMETER RATIO: 2.0, CROSS SECTION: COCOON-SHAPED) | — | — | — | — | — | — | — | — | — | — | — | — | — | — | 41 | — | — | 100 | — |
| NON-FIBROUS INORGANIC FILLER B3 | — | 54 | 54 | 56 | 56 | 59 | 56 | 25 | 40 | 59 | 56 | 54 | 53 | 54 | 54 | — | — | 100 | 43 |
| OLEFINIC COPOLYMER C | 14 | 14 | 11 | 14 | 11 | 15 | 14 | 12 | 15 | 30 | 22 | 19 | 16 | 14 | 14 | 17 | 17 | 5 | 17 |
| OLEFINIC COPOLYMER D1 | — | — | — | 8 | — | — | 8 | 7 | 9 | — | — | — | — | — | — | 9 | 9 | 10 | 9 |
| OLEFINIC COPOLYMER D2 | 5 | 5 | 8 | — | 11 | 15 | — | — | — | — | — | — | — | 5 | — | — | — | — | — |
| B1/B2 | 1.8 | 1.3 | 1.3 | 1.3 | 1.3 | 1.3 | 1.3 | 0.6 | 3.5 | 1.3 | 1.3 | 1.3 | 1.3 | — | — | 158 | 158 | — | 7.0 |
| TOTAL FILLER AMOUNT | 150 | 150 | 150 | 154 | 154 | 163 | 154 | 123 | 177 | 163 | 154 | 150 | 146 | 150 | 150 | 158 | 158 | 200 | 158 |
| THERMAL SHOCK RESISTANCE (CYCLES) | 150 | 180 | 170 | 200 | 190 | 250 | 180 | 230 | 170 | 280 | 230 | 170 | 120 | 80 | 70 | 60 | 200 | 50 | 190 |
| LOW WARPAGE PROPERTY (mm) | 0.04 | 0.05 | 0.05 | 0.05 | 0.05 | 0.05 | 005 | 0.05 | 0.05 | 0.05 | 0.05 | 0.05 | 0.05 | 0.6 | 0.8 | 0.01 | 0.8 | 0.06 | 0.7 |
| MELT VISCOSITY (Pa · s) | 240 | 230 | 220 | 235 | 230 | 240 | 220 | 190 | 240 | 380 | 320 | 280 | 240 | 230 | 235 | 250 | 260 | 350 | 240 |

THE CONTENT UNITS ARE PARTS BY MASS.

REFERENCE SIGNS LIST

1 Insert-molded product
2 Tabular resin molded product
11 Insert member
12 Resin member
120a-d Corner portions
130a-d Brittle portions
Q Resin flow

The invention claimed is:

1. A polyarylene sulfide-based resin composition containing a polyarylene sulfide-based resin A, an inorganic filler B, an olefinic copolymer C, and an olefinic copolymer D, wherein:
the inorganic filler B contains a fibrous inorganic filler B1 having a different diameter ratio of 1.5 or less and a fibrous inorganic filler B2 having a different diameter ratio of 3.0 or more, the different diameter ratio being a ratio of the long diameter and the short diameter of a cross section perpendicular to the longitudinal direction;
a mass ratio B1/B2 of the fibrous inorganic filler B1 and the fibrous inorganic filler B2 is 0.2 or more and 5.0 or less;
the olefinic copolymer C contains an α-olefin-derived structural unit and an α,β-unsaturated acid glycidyl ester-derived structural unit;
the olefinic copolymer D contains at least one olefinic copolymer selected from the group consisting of an ethylene-α-olefinic copolymer D1 and an olefinic copolymer D2 comprising an α-olefin-derived structural unit and an α,β-unsaturated carboxylic acid alkyl ester-derived structural unit;
the content of the olefinic copolymer C is 3 parts by mass or more and less than 19 parts by mass with respect to 100 parts by mass of the polyarylene sulfide-based resin A; and the content of the olefinic copolymer D is 3 parts by mass or more and 30 parts by mass or less in total with respect to 100 parts by mass of the polyarylene sulfide-based resin A.

2. The polyarylene sulfide-based resin composition according to claim 1, wherein the inorganic filler B further contains a non-fibrous inorganic filler B3.

3. The polyarylene sulfide-based resin composition according to claim 1, wherein the total content of the inorganic filler B is 90 parts by mass or more and 220 parts by mass or less with respect to 100 parts by mass of the polyarylene sulfide-based resin A.

4. The polyarylene sulfide-based resin composition according to claim 2, wherein the content of the fibrous inorganic filler B2 is 20 parts by mass or more with respect to 100 parts by mass of the polyarylene sulfide-based resin A and the content of the non-fibrous inorganic filler B3 is 20 parts by mass or more with respect to 100 parts by mass of the polyarylene sulfide-based resin A.

5. The polyarylene sulfide-based resin composition according to claim 2, wherein the non-fibrous inorganic filler B3 has an average particle diameter of 10 μm or more.

6. An insert-molded product having an insert member formed using a metal, an alloy, or an inorganic solid and a resin member covering at least a portion of a surface of the insert member, wherein the resin member is formed using the polyarylene sulfide-based resin composition according to claim 1.

7. The insert-molded article according to claim 6, wherein the resin member has: at least one brittle portion which extends in a predetermined direction and which comprises one or both of a welded portion in which flow terminals of the resin composition have been joined and a stress-concentrating portion in which stress generated by expansion and contraction concentrates; and
a trace of a gate on a surface that extends in a direction approximately perpendicular to a direction in which the at least one brittle portion extends.

* * * * *